US006491114B1

(12) United States Patent
Webel

(10) Patent No.: US 6,491,114 B1
(45) Date of Patent: Dec. 10, 2002

(54) SLOW START CONTROL FOR A HYDRAULIC HAMMER

(75) Inventor: Roger A. Webel, Copley, OH (US)

(73) Assignee: NPK Construction Equipment, Inc., Walton Hills, OH (US)

( * ) Notice: Subject to any disclaimer, the term of this patent is extended or adjusted under 35 U.S.C. 154(b) by 127 days.

(21) Appl. No.: 09/678,205

(22) Filed: Oct. 3, 2000

(51) Int. Cl.[7] ........................ B23B 45/16

(52) U.S. Cl. ........................ 173/206; 173/207; 173/4; 173/11; 91/35; 91/37

(58) Field of Search ........................ 173/206, 207, 173/4, 11; 91/35, 37, 461

(56) References Cited

U.S. PATENT DOCUMENTS

| | | | | | |
|---|---|---|---|---|---|
| 3,561,542 | A | * | 2/1971 | Hanson et al. | 173/1 |
| 3,732,934 | A | * | 5/1973 | Brandenberg | 173/177 |
| 3,752,036 | A | * | 8/1973 | Hicks et al. | 409/80 |
| 3,796,131 | A | * | 3/1974 | Workman et al. | 173/177 |
| 3,845,690 | A | * | 11/1974 | Ziegler | 91/35 |
| 3,872,934 | A | | 3/1975 | Terada | |
| 4,034,817 | A | | 7/1977 | Okada | |
| 4,034,918 | A | * | 7/1977 | Culbertson et al. | 241/236 |
| 4,112,823 | A | * | 9/1978 | Liberman et al. | 307/144 |
| 4,450,753 | A | * | 5/1984 | Basrai et al. | 91/35 |
| 4,852,664 | A | | 8/1989 | Terada et al. | |
| 4,858,702 | A | | 8/1989 | Piras | |
| 4,899,836 | A | | 2/1990 | Venot | |
| 4,899,857 | A | * | 2/1990 | Tateno et al. | 477/73 |
| 4,945,998 | A | | 8/1990 | Yamanaka | |
| 5,119,717 | A | * | 6/1992 | Yasutome | 91/361 |
| 5,174,387 | A | | 12/1992 | Arndt et al. | |
| 5,669,281 | A | | 9/1997 | Comarmond | |
| 5,860,481 | A | | 1/1999 | Prokop et al. | |
| 5,960,893 | A | | 10/1999 | Prokop et al. | |
| 6,334,308 | B1 | * | 1/2002 | Sato et al. | 60/422 |

* cited by examiner

*Primary Examiner*—Eugene Kim
*Assistant Examiner*—Louis Tran
(74) *Attorney, Agent, or Firm*—Fay, Sharpe, Fagan, Minnich & McKee

(57) ABSTRACT

A control system for a heavy duty hydraulic hammer reduces blank firing of the hammer. The control system provides a reduced flow of hydraulic fluid to the hammer for a selected period of time upon actuation of the hammer and then provides full hydraulic flow increasing the frequency of impacts to full rated values.

12 Claims, 4 Drawing Sheets

SLOW START CONTROL FOR A HYDRAULIC HAMMER

BACKGROUND OF THE INVENTION

The present invention relates to a control system for use with heavy duty hydraulic hammers of the type mountable on the boom of construction equipment. More particularly, the present invention provides a control system allowing one to start a heavy duty hydraulic hammer at a reduced impact frequency which is automatically increased to full power after a preselected delay.

Heavy duty hydraulic hammers are well known and used frequently in demolition, mining and construction tasks. These hammers are often mounted at the end of the stick or boom of an excavator. They are supplied with hydraulic fluid under pressure which causes a piston within the hammer to reciprocate, striking a tool, such as a chisel point, which impacts against a workpiece. The piston is forced up by hydraulic fluid with its end compressing gas in a gas chamber. When the piston completes its upward movement, the high pressure fluid is exhausted and the compressed gas drives the piston into the tool. A set amount of hydraulic fluid is required for each upward stroke of the piston.

Heavy duty hydraulic hammers come in various sizes. Smaller units weigh several hundred pounds while larger units can weigh more than 15,000 pounds. These hammers use tool sizes commensurate with their own size and have a rated power capacity commensurate with their size. Hydraulic hammers are used to break up concrete, rock, ore, and the like.

Hydraulic hammers are available from a number of sources commercially. Their design and operation are described in numerous patents including U.S. Pat. No. 3,872,934 to Terada; U.S. Pat. No. 4,034,817 to Okada; U.S. Pat. No. 4,852,664 to Terada; and, U.S. Pat. No. 4,945,998 to Yamanaka.

One type of hydraulic hammer generally comprises a housing containing a piston, a cylinder and a gas chamber at the top of the cylinder. The piston is driven upwardly by hydraulic fluid compressing gas in the gas chamber. When the piston reaches the top of its stroke, the fluid is exhausted and high gas pressure in the gas chamber forcefully moves the piston downwardly. The piston strikes a tool held in the hammer which in turn strikes a workpiece. The power supplied by the high pressure hydraulic fluid is expended in impacting on the workpiece. The impact frequency, the number of impacts per minute, of a hydraulic hammer can be several hundred or several thousand impacts per minute. Each impact involves significant amounts of energy.

While hydraulic hammers generally operate well, problems still exist. When a hammer is operated with the tool not in contact with a workpiece, significant amounts of energy must be absorbed by the hammer itself. Energy is being supplied by the high pressure hydraulic fluid but is not being absorbed by the workpiece. Therefore, significant amounts of energy are absorbed within the hammer, heating it and potentially damaging it. Similar problems occur when the hammer tool is only lightly in contact with a workpiece or in glancing contact with a workpiece. In such situations, the tool is not fully impacting upon a workpiece capable of absorbing energy. Energy is absorbed in the hammer to its detriment. This situation is so common it has a name. Hammers operating when not engaged against a workpiece are often said to be blank firing.

SUMMARY OF THE INVENTION

Applicant has found that a significant portion of blank firing occurs within the first several seconds of hammer actuation. Thus, blank firing often occurs when a hammer is first positioned on a workpiece and the hammer either slides off resulting in blank firing or quickly breaks the workpiece resulting in blank firing. Often, several impact in a glancing or lightly engaged mode are required before the hammer tool can dig into and grip a workpiece sufficient to supply adequate back pressure to load a hammer. If done at full frequency, the hammer is hard to control and will bounce of a workpiece before it can engage it and grip it.

In accordance with the present invention, a control system for a heavy duty hydraulic hammer is provided in which the hammer may be operated in a low frequency, or slow mode, for a selected initial period whenever the hammer is actuated.

Yet further in accordance with the invention, the initial period of low frequency operation is selectable by an operator in an excavator cab by means of a hand operated control.

Still further in accordance with the invention, a mode switch is provided in the control system allowing an operator to select the low frequency start feature or a constant low frequency operation setting.

Yet further in accordance with the invention, a control system is provided which selectively provides hydraulic fluid flow to a heavy duty hydraulic hammer at a rate considerably reduced from its normal operating rate whereby low frequency operation is achieved.

Still further in accordance with the invention, an electro-hydraulic hammer control system is provided which allows a user to select from the cab of an excavator between an initial low frequency operation for a selected period of time, constant low frequency operation, full power start operation, and no operation at all.

It is a principal object of the present invention to provide a control system for a heavy duty hydraulic hammer which minimizes blank firing.

It is another object of the present invention to provide a control system for a heavy duty hydraulic hammer which allows an operator to establish a workpiece grip point at low frequency when working on larger, difficult workpieces.

It is yet another object of the present invention to provide a control system for a heavy duty hydraulic hammer allowing an operator to select a period of initial low frequency operation prior to automatic full power operation with simple controls and a cab.

It is still another object of the present invention to provide a versatile control system for a heavy duty hydraulic hammer which is robust, easy to use, and easy to install into existing excavators.

BRIEF DESCRIPTION OF THE DRAWINGS

The foregoing objects, and others, will in part be obvious and in part pointed out more fully hereinafter in conjunction with the written description of the preferred embodiments of the invention illustrated in the accompanying drawings in which.

DESCRIPTION OF THE PREFERRED EMBODIMENTS

Figure 3:
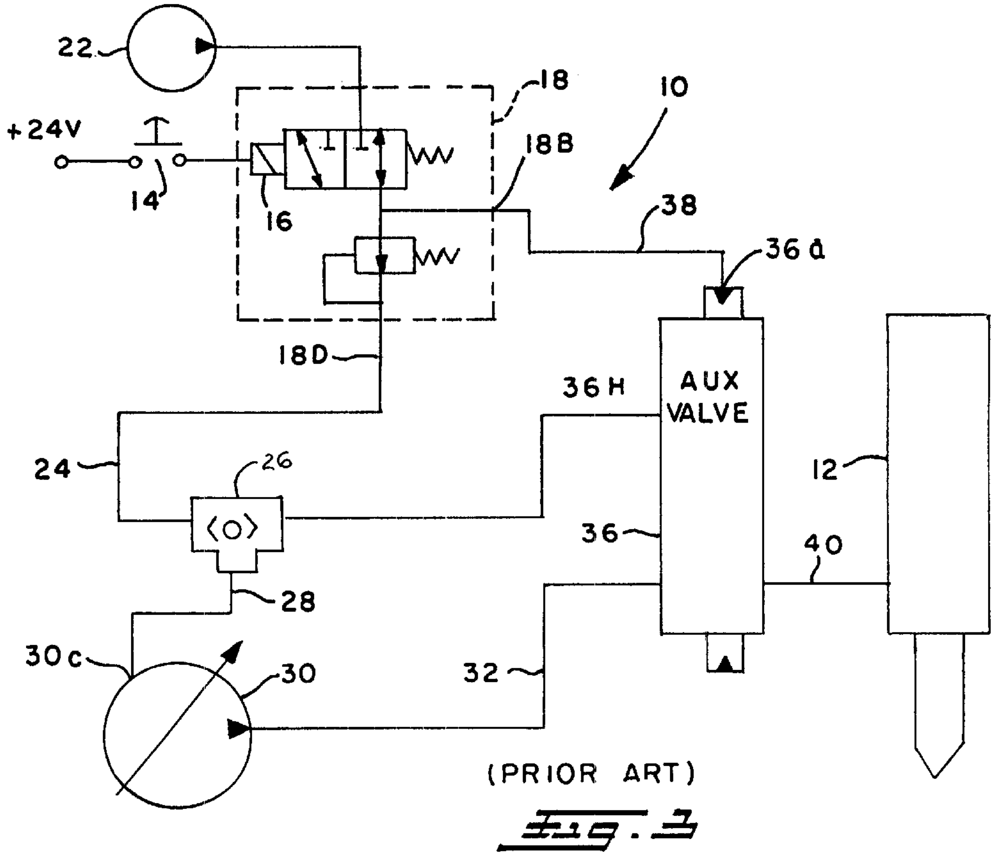
(PRIOR ART) Fig. 3
FIG. 3 is a schematic block diagram showing a prior art control system.

Referring now in greater detail to the drawings, wherein the showings are made for the purposes of illustrating preferred embodiments of the invention and not for the purposes of limiting the invention, FIG. 3 illustrates a prior art control system 10 for a heavy duty hydraulic hammer 12.

The control system 10 uses components which are specific to controlling a hydraulic hammer 12 and components which are part of the standard equipment of the heavy duty excavator available from companies including Caterpillar and others.

An electrical switch 14 is positioned in the operator cab. The switch 14 is normally a momentary contact switch which must be held closed to operate the hammer. It can be a button or lever operated by hand or a foot switch. When the switch 14 is closed by the operator, current is provided to a solenoid 16 forming part of a solenoid operated pressure regulating valve 18. The valve 18 receives high pressure hydraulic fluid from a pilot pump 22. The valve 18 has two outputs, 18B which is unregulated and 18D which is regulated. Hydraulic fluid is provided at both the unregulated output 18B and the regulated output 18D when the switch 14 is closed. The regulated pressure fluid from output 18D is provided through fluid line 24 to a shuttle he output of the shuttle valve 26 is provided through a fluid line 28 to a variable output main pump 30 at its control input 30C. The main pump 30 provides working volumes of hydraulic fluid through hydraulic fluid line 32 to an auxiliary valve 36. The auxiliary valve 36 also has a control input 36*a*. The auxiliary valve control input 36*a* is in fluid communication with the output 18B of the solenoid operated pressure regulating valve 18 through hydraulic fluid line 38. When the solenoid operated pressure regulating valve 18 is actuated, fluid is provided through the line 38 to the auxiliary valve input 36*a* which causes the valve to allow flow of hydraulic fluid from the working fluid line 32 through the valve 36 through a fluid line 40 to the hammer 12.

The auxiliary valve 36 also has a fluid flow regulating function. The auxiliary valve 36 senses the flow of fluid being delivered through the working fluid line 32 and provides fluid at a pressure indicative of the working fluid flow at an auxiliary valve control output 36H. The auxiliary valve control output 36H is connected through a fluid line an input of the shuttle valve 26. Shuttle valve 26 is thus provided with two control inputs. One from the solenoid operated pressure regulating valve 18 and the second from the auxiliary valve 36. As is conventional, the shuttle valve allows fluid flow only from the input having a higher pressure to the output to line 28 and to the pump control 30C.

The controls within the auxiliary valve 36 and the connection through the shuttle valve 26 assures that the hammer 12 is provided with hydraulic fluid at rated flow when the switch 14 is closed.

The above-described control system is conventional. The auxiliary valves and pumps are commercially available products often forming part of an excavator. The control system provides hydraulic fluid to the hammer 12 at rated pressure and desired flow whenever the switch 14 is closed.

Figure 1:
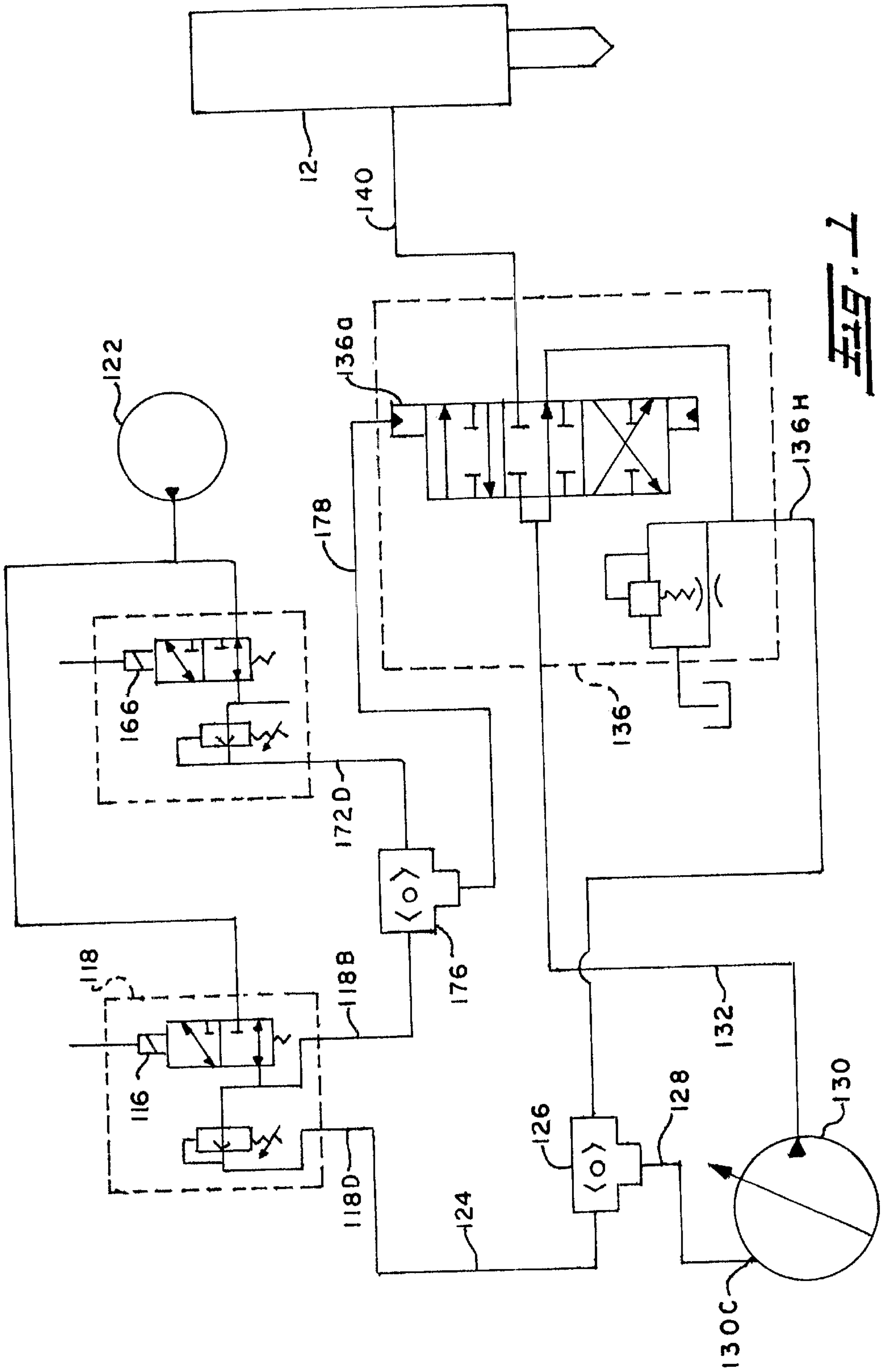
FIG. 1 is a schematic drawing of a hydraulic control system in accordance with the present invention.
Figure 2:
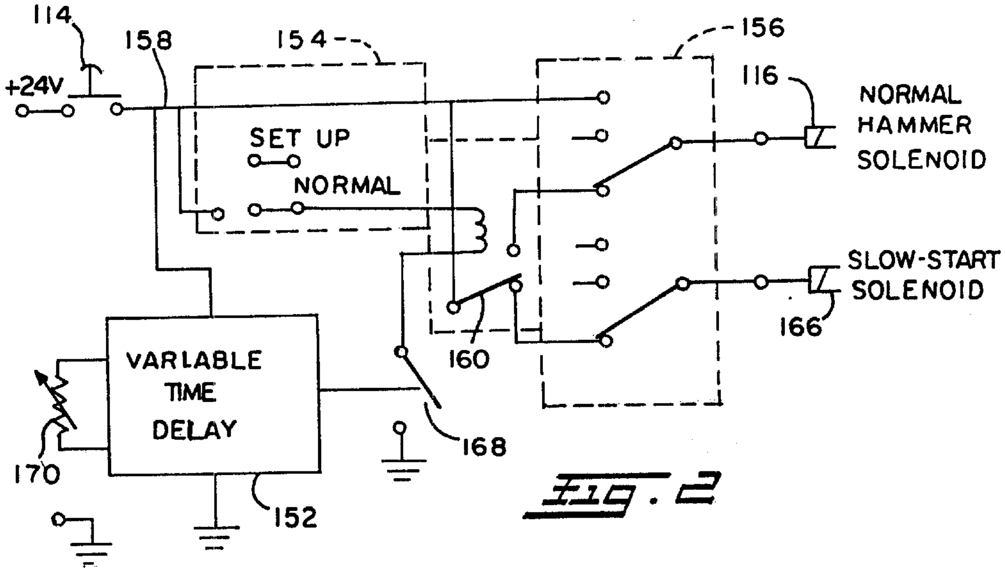
FIG. 2 is a schematic block drawing of the electrical components of the control system, the hydraulic components of which are shown in FIG. 1.

Referring now to FIGS. 1 and 2, a control system in accordance with the present invention is illustrated. FIG. 2 illustrates schematically the electrical components of the control system while FIG. 1 illustrates schematically the hydraulic components of the control system. With reference to FIG. 2, a momentary contact hammer control switch 114 connects a source of 24 volt control power to a variable timer 152, a mode switch 154 and a circuit switch 156. The momentary contact switch 114 is in the operator's cab and is actuated by the operator when he wishes to energize the hammer 12. The variable timer 152, mode switch 154 and the circuit switch 156 are all contained in a small housing mounted conveniently for operator control. The circuit switch 156 is a three position rocker switch which is manually switched between three positions. The first position (illustrated) is the "slow start on" position and makes use of the present invention. The second or center position is the off position and prevents hammer operation. The third position connects control power directly to the normal hammer solenoid and operates in a manner identical to the prior art control system illustrated in FIG. 3.

When the circuit switch is in the first, slow start on position, electric power is supplied through the momentary contact switch 114 through the main power line 158 through the contacts of a relay 160, to the circuit switch 156, to the slow start solenoid 166. This will cause operation of the hydraulic control system seen in FIG. 1 in the slow start mode to be described herein below.

Closing of the momentary contact switch 114 also supplies power to the variable time delay circuit 152. The variable time delay circuit 152 waits a selected period of time and then closes switch 168. In the preferred embodiment, switch 168 is a solid state switch such as a transistor and is mounted integrally with the variable time delay circuit 152. Closing of the switch 160 completes a circuit from the main power line 158 through the set-up switch (in the normal mode), the relay 160 to ground. This energizes the relay 160 disconnecting the main power line 158 from the slow start solenoid 166 and connecting the main power line 158 to the normal hammer solenoid 166. Thus, in the normal mode, the circuit described sequentially energizes first the slow start solenoid 166, de-energizes the slow start solenoid 166, and energizes the normal hammer solenoid 116. The period for which the slow start solenoid 166 is energized is selected with a variable resistor delay knob 170. In the preferred embodiment, the delay can be selected to be a period from 1 to 16 seconds.

The mode switch 154 is a two position rocker switch. In the normal position, the mode switch allows operation of the solenoid 160 thereby enabling the rest of the circuit. In the "set-up" position, the mode switch 154 disconnects the solenoid 160 from the main power line 158. As the solenoid 160 cannot be energized, the main power line 158 will stay connected to the slow start solenoid 166 and the normal hammer solenoid 116 will never be energized. The hammer will operate in the slow start mode for as long as the momentary contact switch 114 is actuated.

Referring now to FIG. 1, the slow start solenoid 166, when energized, opens the slow start solenoid operated pressure regulating valve 172. The slow start valve 172 receives high pressure hydraulic fluid from a pilot pump 122. It has a regulated output 172D which is provided with hydraulic fluid at an adjustably regulated pressure significantly reduced from the pilot pump output pressure. The hydraulic fluid from the output 172D is applied through a fluid line 174 to a shuttle valve 176. The output of the shuttle valve 176 is applied through a fluid line 178 to a control input 136*a* of the auxiliary valve 136. The reduced control pressure applied at the auxiliary valve input 136*a* partially opens the auxiliary valve 136. This allows high pressure hydraulic fluid to flow from the main pump 130 through the main power hydraulic fluid line 132 through the auxiliary valve 136, through fluid line 140 to the hammer 12. However, since the auxiliary valve 136 is only partially open, flow through line 140 is at a low rate. A portion of the flow through the auxiliary valve 136 flows through a control output 136H to a shuttle valve 126 and to the control input 130C of the main pump 130 causing the pump to operate at reduced capacity. The delivery of hydraulic fluid to the hammer 12 is significantly less than full rated flow. The hammer 12 will therefore operate at a frequency significantly less than its rated frequency. The impacts are full power impacts. However, the impact frequency is significantly reduced.

After the variable time delay circuit 152 (FIG. 2) has timed out and closed the switch 168, the slow start valve 172 will close preventing flow to output 172D and the normal hammer solenoid 116 will cause the normal hammer solenoid operated pressure regulating valve 118 to open. High pressure fluid is received from the pilot pump 122. Regulated pressure fluid is provided to output 118D and unregulated fluid is provided at output I 18B. Output 118D provides fluid at an adjustable regulated pressure greater than that seen at the slow start valve output 172D through a fluid line 124 to a shuttle valve 126. The regulated pressure hydraulic fluid is applied through a fluid line 128 to the controlling port 130*c* of the main pump 130. This causes the main pump 130 to provide rated flow for the hammer 12.

High pressure hydraulic fluid is also provided from the normal hammer valve output 118B through the shuttle valve 176 and the fluid line 178 to the auxiliary valve input 136*a*. This flow causes the auxiliary valve 136 to open sufficiently to provide full rated flow from the pump 130 through the fluid line 140 to the hammer 12. In this configuration, rated flow is provided independent of pressure and temperature variations in the hydraulic fluid delivered by the main pump 130.

Figure 4:
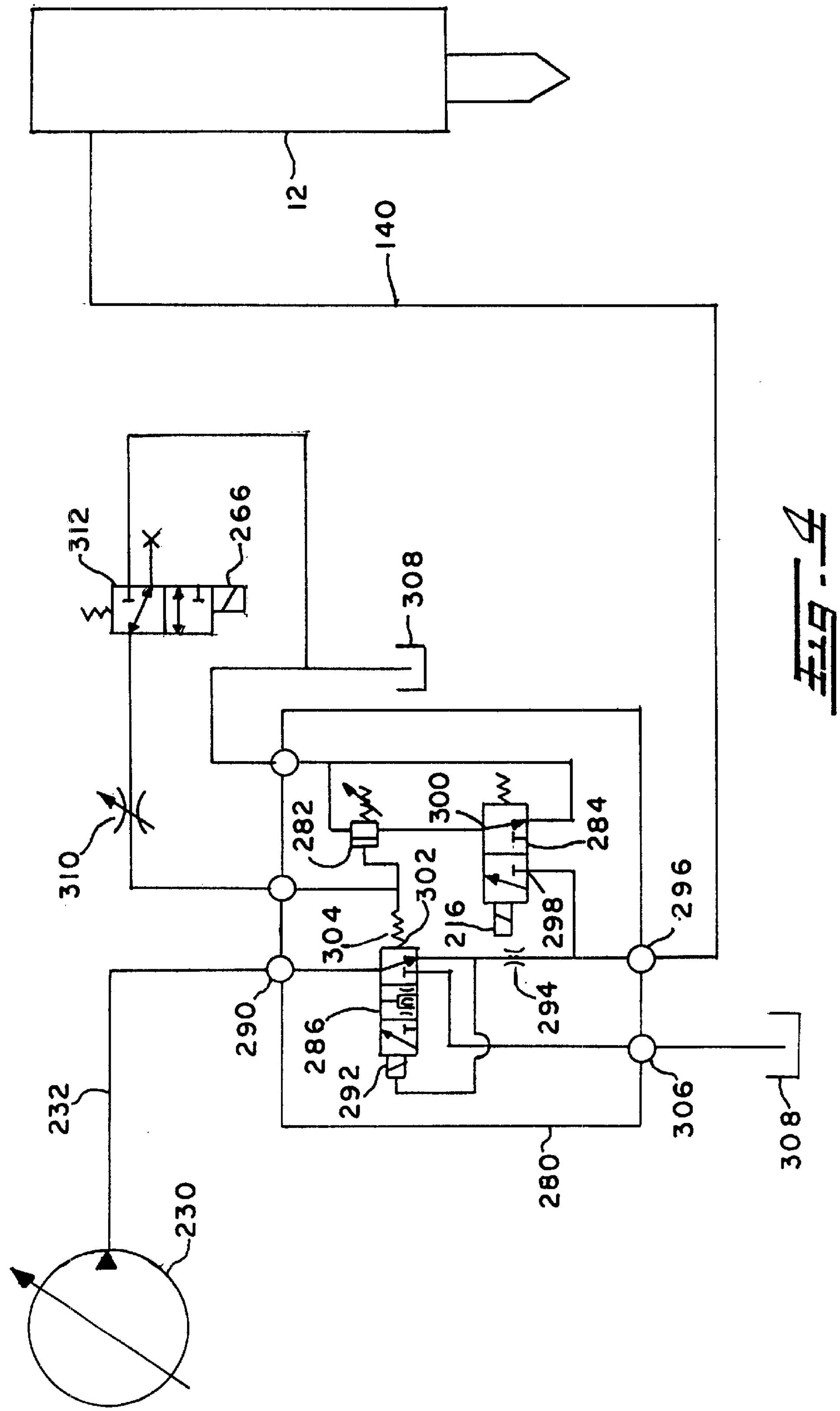
FIG. 4 is a schematic block drawing of an alternate hydraulic control system; and, FIG. 5 is a schematic block drawing of the electrical components of a control system, the hydraulic components of which are shown in FIG. 4.
Figure 5:
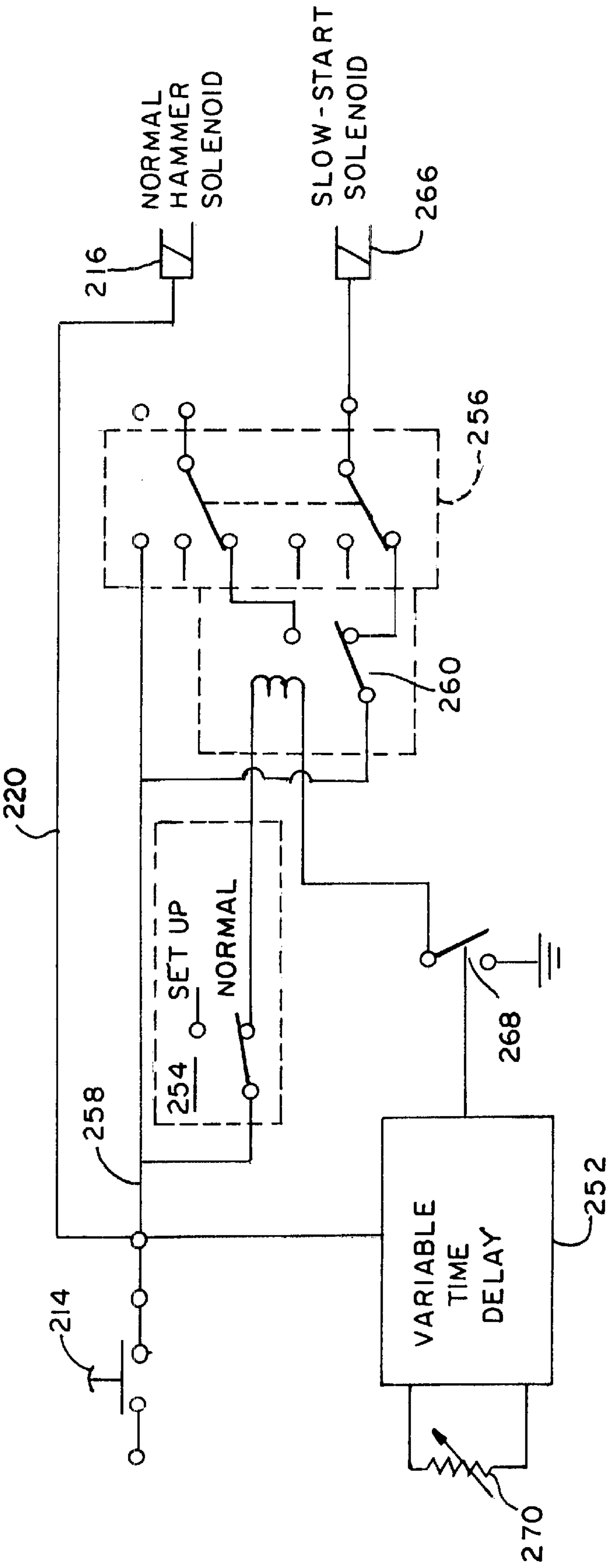

A second embodiment of the invention is illustrated in FIGS. 4 and 5.

Not all excavators are equipped with an auxiliary valve such as that used in the embodiment of the invention shown in FIGS. 1 and 2. When a hammer is used in some of the excavators not having an auxiliary valve, a separate flow control valve is installed. FIG. 4 schematically illustrates hydraulic components implementing the present invention in such machines. FIG. 5 schematically illustrates the electrical components used with the hydraulic components of FIG. 4.

Referring to FIG. 5, the electrical control components are similar to those used in the first embodiment and illustrated in FIG. 2. The difference is that the normal hammer solenoid 216 is wired directly to the switch terminal of the momentary contact hammer control switch 214. Thus, whenever the momentary control switch 214 is closed, the normal hammer solenoid 216 is energized.

The main power line 258 also receives 24 volt power when the momentary contact switch 214 is activated and supplies current to the variable time delay circuit 252, the mode switch 254 and a supply contact of the solenoid 260. With the mode switch 254 in the normal position, the circuit operates as follows. When the momentary contact switch 214 is actuated, the normal hammer solenoid 216 is energized. The variable time delay circuit 252 is also energized and starts to time. As the variable time delay circuit 252 has not yet timed out, switch 268 remains open. Thus the relay 260 is not energized and current flows from the main power line 258 through the solenoid 260 and the circuit switch 256 to the slow start solenoid 266. Thus, both the normal hammer solenoid 216 and the slow start solenoid 266 are energized during the interval from actuation of the momentary contact switch 214 and the timing out of the variable time delay 252.

A time delay is selected with the variable resistor 270. This time delay starts timing out when the switch 214 is closed. When the time delay is completed, the variable time delay circuit 252 closes the switch 268. When the switch 268 is closed, current may flow from the main power line 258 through the set-up switch 254, the coil of the relay 260 and the switch 268 to ground. The relay 260 is energized and current is no longer supplied to the lower set of contact of the circuit switch 256. Thus, current is no longer supplied to the slow-start solenoid 266. Current continues to be applied to the normal hammer solenoid 216 through the bypass electrical line 220. The hammer thus operates normally after the variable time delay switch has timed out.

The circuit switch 256 operates somewhat differently in this embodiment when compared to the first embodiment. In the first embodiment, the three positions of the circuit switch were: slow start enabled, system off, and slow start disabled. In the current embodiment, the three positions of the circuit switch are: slow start enabled, slow start disabled, and slow start disabled. This difference in function is the result of use of the bypass electrical line 220 to energize the normal hammer solenoid 216 and the non-use of the second set of contacts in a circuit switch 256. However, this arrangement allows use of the single circuit design contained in an identical housing for both embodiments of the invention.

Referring now to FIG. 4 wherein the hydraulic components of the control system are disclosed, one sees a main hydraulic pump 230, control valves, and a heavy duty hydraulic hammer 12. Hydraulic fluid flows from the pump 230 through the main fluid line 232 to a multi-valve 280. The multi-valve 280 contains several components including a pressure relief 282, a solenoid actuated valve 284, and a flow regulating three position valve 286.

The main hydraulic line 232 is connected to the multi-valve input 290. The input 290 of the multi-valve is also the input of the flow regulating three position valve 286. The output of the flow regulating valve 286 is connected to a first control input 292 of the flow regulating valve 286 and also to the upstream side of an orifice 294. The downstream side of the orifice 294 is connected to the output 296 of the multi-valve 280 and also to a first hydraulic connection 298 of the solenoid operated valve 284. A second hydraulic connection 300 of the solenoid operated valve 284 is connected to a second control input 302 of the flow regulating valve 286. A spring bias 304 is provided assisting the second control input 302. When the solenoid actuated valve 284 is actuated by the normal hammer solenoid 216, the first hydraulic connection 298 is placed in fluid communication with the second hydraulic connection 300. The downstream side of the orifice 294 is therefore in fluid communication with the second input 302 of the flow control valve 286. The upstream side of the orifice 294 is in fluid communication with the first input 292 of the flow control valve 286. Thus, the flow control valve 286 is provided with the pressure on the upstream side of the orifice 294 and the downstream side of the orifice 294 and therefore regulates flow from the input 290 to the output 296 operating as a flow control valve. Excess flow is vented through the excess flow output 306 to the hydraulic reservoir 308. This control arrangement provides regulated constant rated power flow from the pump 230 through the main hydraulic line 232, the flow control valve 286, hydraulic line 140 to the hammer 12. The hammer operates at rated capacity.

In accordance with the present invention, the second control input 302 of the flow control valve 286 is also connected to a variable orifice 310 which is in turn connected to a solenoid actuated pilot valve 312 which is in turn vented to the hydraulic reservoir 308. The pilot valve 312 is actuated by the slow start solenoid 266. When the slow start solenoid 266 is de-energized, the valve 312 is open and no flow through the variable orifice 310 occurs. When the slow start solenoid 266 is energized, the valve 312 is actuated and flow through the variable orifice 310 is allowed. This bleeds off a portion of the fluid which would normally flow to the second control input 302 of the flow control valve 286. Pressure at the second control input 304 is lowered. The pressure of the first control input 292, which has not been altered, therefore exerts greater control over the spool in the flow control valve 286 and flow through the flow control valve 286 is reduced. This mimics a larger pressure differential across the orifice 294. By either analysis, flow is reduced. The amount of flow reduction is selected by adjusting the variable orifice 310.

Thus, during the interval in which the time delay circuit 252 has not timed out, both the normal hammer solenoid 216 and the slow start solenoid 266 are energized. Flow from the pump 230 to the hammer 12 is significantly reduced in accordance with the setting at the variable orifice 310. The hammer 12 operates with full impact energy but at a significantly reduced impact rate. When the variable time delay circuit 252 has timed out, the slow start solenoid 266 is de-energized, the pilot valve 312 opens and the flow control valve 286 again operates as a regulated control flow valve providing full rated flow to the hammer.

When both the slow start solenoid 266 in the normal hammer solenoid 216 are de-energized, the second control input of the flow control valve 286 is vented to the hydraulic fluid tank, and the flow control valve 286 provides no flow to the output 296 deactivating hammer 12.

While considerable emphasis has been placed herein on the structures of the preferred embodiments and on the structural interrelationship between the component parts thereof, it will be appreciated that many embodiments of the invention can be made and that many changes can be made in the embodiments herein illustrated and described without departing from the principles of the invention. Accordingly, it is to be understood that the foregoing descriptive matter is to be interpreted merely as illustrative of the preferred invention and not as a limitation.

Having thus the invention, it is claimed:

1. A control for a hydraulic hammer comprising:

a source of high pressure hydraulic fluid;

a first valve controlling flow of said high pressure fluid to said hammer having a control input;

a first shuttle valve having an output, a first input and a second input, said output connected to said control input on said first valve;

a second valve, said second valve being a solenoid actuated valve having a first output which will provide fluid at a first selected pressure only when said second valve solenoid is actuated, said first output being connected to said first input of said first shuttle valve;

a third valve, said third valve being a solenoid actuated valve having an output which will provide fluid at a second selected pressure only when said third valve solenoid is actuated, said output being connected to said second input on said first shuttle valve; and, an electrical control means responsive to an operator input adapted to provide power to said third valve solenoid for a selected period, discontinue power to said third valve solenoid and provide power to said second valve solenoid, where said first valve provides a reduced flow ofhigh pressure fluid to said hammer for said selected period and full flow of said high pressure fluid thereafter.

2. The control of claim 1 wherein said electrical control comprises a first switch, a variable time delay circuit, a second switch actuated by said time delay circuit and a time delay solenoid, said first switch adapted to provide power to said variable time delay circuit, said time delay solenoid and said third valve solenoid when said first switch is actuated, said variable time delay circuit adapted to actuate said second switch at the end of said selected period, said second switch adapted to actuate said time delay solenoid at the end of said selected period, and said time delay solenoid adapted to interrupt power to said third valve solenoid at the end of said selected period and provide power to said second valve solenoid at the end of said selected period.

3. The control of claim 2 wherein said electrical control additionally comprises a third switch which enables sequential operation of said third valve solenoid and said second valve solenoid in a first position; and, disables sequential operation of said third and second valve solenoids while enabling continuous power to said third valve solenoid in a second position.

4. The control of claim 2 wherein said electrical control additionally comprises a fourth switch which enables sequential operation of said third and second valve solenoids in a first position, disables operation of said hammer in a second position and enables continuous power to said second valve solenoid in a third position.

5. The control of claim 3 wherein said electrical control additionally comprises a fourth switch which enables sequential operation of said third and second valve solenoids in a first position, disables operation of said hammer in a second position and enables continuous power to said second valve solenoid in a third position.

6. A control for a hydraulic hammer comprising:

a source of high pressure hydraulic fluid;

a first valve assembly controlling flow of said high pressure fluid to said hammer, said first valve assembly being actuated by an associated first valve solenoid such that said first valve assembly provides hydraulic fluid to said hammer when said first valve solenoid is actuated and provides no hydraulic fluid to said hammer when said first valve solenoid is not actuated; and, a second valve having an unactuated state and an actuated state, said first valve assembly providing hydraulic fluid to said hammer at a first flow rate when said first valve solenoid is actuated and said second valve is unactuated, said first valve assembly providing hydraulic fluid to said hammer at a second flow rate substantially less than said first flow rate when said first valve solenoid is actuated and said second valve is actuated, said second valve being actuated by a second valve solenoid, said hammer operating at a reduced frequency when supplied with hydraulic fluid at said second flow rate.

7. The control of claim 6, wherein said electrical controls means comprises an input, a timer, and a switch, said electrical control assembly solenoid when said input is active and to actuate said second valve solenoid for a period determined by said timer following the transition to the active state for said input and, de-actuating said second valve solenoid at the expiration of said period whereby said hammer is provided with hydraulic fluid at a reduced flow for said period and full flow thereafter.

8. A control for a hydraulic hammer comprising:

a source of high pressure hydraulic fluid;

a first valve assembly controlling flow of said high pressure fluid to said hammer, said first valve assembly being actuated by an associated first valve solenoid such that said first valve assembly. provides hydraulic fluid to said hammer when said first valve solenoid is actuated and provides no hydraulic fluid to said hammer when said first valve solenoid is not actuated, said first valve assembly comprising: a flow regulating valve having a first control input, a second control input, a main flow input and a main flow output; an orifice receiving hydraulic fluid flow from said main flow output having an upstream side and a downstream side; said flow regulating valve first control input in fluid communication with said upstream side of said orifice; a solenoid actuated valve actuated when said first valve solenoid is actuated, said solenoid actuated valve placing said flow regulating valve second control input in fluid communication with said downstream side of said orifice when said first valve solenoid is actuated;

a second valve having an unactuated state and an actuated state, said first valve assembly providing hydraulic fluid to said hammer at a first flow rate when said first valve solenoid is actuated and said second valve is unactuated, said first valve assembly providing hydraulic fluid to said hammer at a second flow rate substantially less than said first flow rate when said first valve solenoid is actuated and said second valve is actuated, said second valve being actuated by a second valve solenoid, said hammer operating at a reduced frequency when supplied with hydraulic fluid at said second flow rate, said second valve in fluid communication with said flow regulating valve second input and diverting a portion of the flow to said second control input when said second valve solenoid is actuated; and, an electrical control assembly comprising an input, a timer, and a switch, said electrical control assembly adapted to actuate said first valve solenoid when said input is active and to actuate said second valve solenoid for a period determined by said timer following the transition to the active state for said input and, de-actuating said second valve solenoid at the expiration of said period whereby said hammer is provided with hydraulic fluid at a reduced flow for said period and full flow thereafter.

9. The control of claim 8 wherein said second valve solenoid is in fluid communication with an adjustable orifice which is in turn in communication with said flow regulating valve second control input whereby the flow reduction caused by actuation of said second valve solenoid is adjustable.

10. A control for a hydraulic hammer comprising a source of high pressure hydraulic fluid;

a first valve assembly controlling flow of said high pressure fluid to said hammer, said first valve assembly being actuated by an associated first valve solenoid such that said first valve assembly provides hydraulic fluid to said hammer when said first valve solenoid is actuated and provides no hydraulic fluid to said hammer when said first valve solenoid is not actuated;

a second valve having an unactuated state and an actuated state, said first valve assembly providing hydraulic fluid to said hammer at a first flow rate when said first valve solenoid is actuated and said second valve is unactuated said first valve assembly providing hydraulic fluid to said hammer at a second flow rate substantially less than said first flow rate when said first valve solenoid is actuated and said second valve is actuated, second valve solenoid, said hammer operating at a reduced frequency when supplied with hydraulic fluid at said second flow rate;

an electrical control assembly comprising an input, a timer, and a switch, said electrical control assembly adapted to actuate said first valve solenoid when said input is active and to actuate said second valve solenoid for a period determined by said timer following the transition to the active state for said input and, de-actuating said second valve solenoid at the expiration of said period whereby said hammer is provided with hydraulic fluid at a reduced flow for said period and full flow thereafter; and, a setup switch adapted to disable sequential operation of said solenoids and enable continuous power to said second valve solenoid.

11. The control of claim 10 further comprising a mode switch adapted to disable sequential operation of said solenoids and enable continuous power to said first valve solenoid.

12. The control of claim 7 wherein said timer is variable whereby said period may be selected by an operator.

* * * * *